Jan. 12, 1943. J. MERCIER 2,308,379
WHEEL
Filed April 15, 1939

INVENTOR
Jean Mercier
BY
Watson, Cole, Grindle & Watson
ATTORNEY

Patented Jan. 12, 1943

2,308,379

UNITED STATES PATENT OFFICE 2,308,379

WHEEL

Jean Mercier, Paris, France; vested in the Alien Property Custodian

Application April 15, 1939, Serial No. 268,095
In Great Britain April 27, 1938

6 Claims. (Cl. 301—6)

The present invention relates to vehicle wheels and more especially wheels for the landing gears of aircraft.

The chief object of the present invention is to provide a wheel of this kind which is better adapted to meet the requirements of practice than those used for the same purpose up to the present time.

According to the first feature of the invention, the wheel includes two distinct wheel flanges and a rim made of two portions, each integral with one of said wheel flanges, a brake drum included in the wheel being fixed directly and preferably in a detachable manner to both of said rim portions.

According to another feature of the invention, which is used in connection with the first mentioned feature so as to form a new combination, each of the wheel flanges is mounted on the wheel axle with the interposition of a bearing and, while the inner wheel flange is provided with a thrust bearing, the other wheel flange is provided with a simple bearing, adapted to transmit no axial thrust.

Other features of the present invention will result from the following detailed description of some specific embodiments thereof.

Preferred embodiments of the present invention will be hereinafter described, with reference to the accompanying drawing, given merely by way of example, and in which.

Figure 1:
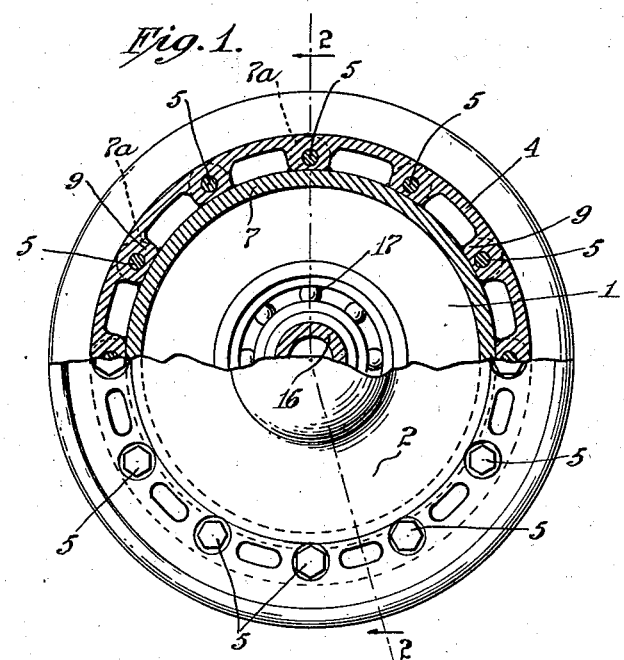
Fig. 1 is an elevational view of a wheel made according to the first embodiment of the invention, the top part being shown in section on the line 1—1 of Fig. 2.
Figure 2:
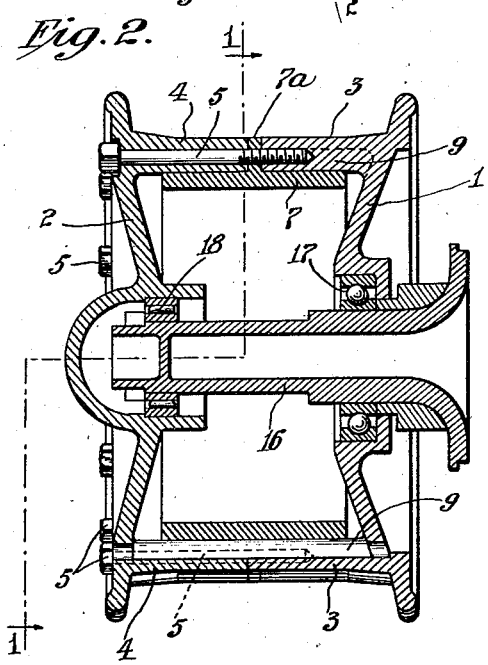
Fig. 2 is an axial sectional view of the same wheel, shown on the line 2—2 of Fig. 1.

In the embodiment of Figs. 1 and 2, two wheel flanges are designated by 1 and 2. The wheel rim is constituted by the rim portions 3 and 4, integral respectively with these wheel flanges 1 and 2. These two rim portions 3 and 4 fit against each other along a plane surface. This surface may be of any other desired shape but no complicated joining means are required since experience has shown that no appreciable flexing or bending stresses are not exerted upon parts 3 and 4 and that the resistance of the means for assembling said two parts together, herein pins or bolts 5, is sufficient to absorb any stress exerted on the rim without calling for any other means to that end. The flange 1 is intended to withstand axial stresses and has its annular cross-section reinforced by radial depressions forming inner ribs 1a corresponding to the ribs 9 of its rim portion 3. Said flange 1 is mounted on the spindle 16 by means of a ball bearing 17, whereas flange 2 is mounted thereon by means of a roller bearing 18.

Flange 1 is intended to withstand axial stresses and is accordingly mounted on the spindle 16 by means of a ball bearing 17, whereas flange 2 is mounted thereon by means of a roller bearing 18. At intervals, the rim portions 3 and 4 are reinforced as shown at 9. In these reinforced portions, part of rim portions 3, 4 and 9, adjacent the surface on which 3 and 4 meet, is cut away to make room for projection 7a rigid with brake drum 7. The rim portions and projection 7a are perforated to receive bolt 5 engaging screw threads formed in the perforation and adapted to clamp the rim portions and the projection of the brake drum which lies between them together. The brake drum rests on the reinforced portions of the rim and is at a certain distance from the latter throughout the non-reinforced portions. This facilitates circulation of air and cooling of the brake drum.

It is an advantageous feature of my present invention that axial stresses to which the wheel flanges may be submitted are diminished due to the cylindrical and coaxial structure of the brake drum. Whatever axial stresses may occur can be taken up by one of the wheel flanges as, for instance, the inner wheel flange (i. e. flange 1 in the illustrated examples) so that only the latter will have to be mounted with the interposition of a thrust bearing (as, for instance, ball bearing 17), while for the other flange a simple bearing (as, for instance, roller bearing 18) will be sufficient.

While I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

I claim:

1. A wheel for landing gear of aircraft and other vehicles, comprising a wheel flange, a rim portion integral with said flange and extending axially inwardly, a wheel member including another flange, a rim portion thereon adjacent to the axially inner end of said first rim portion, a brake-drum having projections extending between said rim portions of said wheel, and means for securingly clamping together said rim portions and brake-drum projections.

2. A wheel according to claim 1, wherein said wheel flanges are arranged in spaced relation and said brake-drum is located inside the rim and between said flanges.

3. A vehicle wheel, and especially a wheel for an aircraft landing gear, which comprises, in combination, two wheel flanges, two rim portions integral with said wheel flanges respectively and extending therefrom toward each other so as to fit against each other, a cylindrical brake drum coaxial with said rim portions and having projections extending between said rim portions, and fixation means for securing both said rim portions to each other and said projections to said rim portions.

4. A vehicle wheel and especially a wheel for an aircraft landing gear, which comprises, in combination, two wheel flanges, one on the inner side of the wheel and the other on the outer side thereof, two rim portions integral with said wheel flanges respectively and extending therefrom toward each other so as to fit against each other, a cylindrical brake drum coaxial with said rim portions and having projections extending between said rim portions, fixation means for securing both said rim portions to each other and said projections to said rim portions, a thrust bearing at the central part of said inner wheel flange, and a simple bearing, adapted to transmit no axial stress, at the central part of the other wheel flange.

5. A vehicle wheel, and especially a wheel for an aircraft landing gear, which comprises, in combination two wheel flanges, one on the inner side of the wheel and the other on the outer side thereof, two rim portions integral with said wheel flanges respectively and extending therefrom toward each other so as to fit against each other, a cylindrical brake drum coaxial with said rim portions, and having projections extending between said rim portions, fixation means for securing both said rim portions to each other and said projections to said rim portions, a thrust bearing at the central part of said inner wheel flange, and a roller bearing at the central part of the outer wheel flange.

6. A vehicle wheel and especially a wheel for an aircraft landing gear, which comprises, in combination, two wheel flanges, one on the inner side of the wheel and the other on the outer side thereof, two rim portions integral with said wheel flanges respectively and extending therefrom toward each other so as to fit against each other, said rim portions having corresponding inward projections on their inner faces, with a space left between the respective projections of the two rim portions, a cylindrical brake drum coaxial with said rim portions having lugs on its outer face adapted to fit in said spaces, fixation means parallel to the axis of the wheel extending between said projections of the rim portions for assembling them together, said fixation also extending through a hole provided in each of said lugs, a thrust bearing at the central part of the inner wheel flange, and a simple bearing, adapted to transmit no axial thrust, at the central part of the other wheel flange.

JEAN MERCIER.